United States Patent [19]

Fusimi et al.

[11] Patent Number: 4,895,216
[45] Date of Patent: Jan. 23, 1990

[54] ELECTRICALLY DRIVEN POWER STEERING APPARATUS

[75] Inventors: Takehiko Fusimi, Kariya; Naoji Sakakibara, Chiryu, both of Japan

[73] Assignee: Aisin Seiki Kabushikikaisha, Aichi, Japan

[21] Appl. No.: 249,236

[22] Filed: Sep. 23, 1988

Related U.S. Application Data

[63] Continuation of Ser. No. 45,999, May 4, 1987, abandoned.

[30] Foreign Application Priority Data

May 6, 1986 [JP] Japan .................................. 61-103666

[51] Int. Cl.$^4$ .............................................. B62D 5/04
[52] U.S. Cl. .................................. 180/79.1; 73/862.33; 318/489; 364/424.05
[58] Field of Search .................. 180/79.1; 364/424.04, 364/424.05; 73/862.33; 318/488, 489

[56] References Cited

U.S. PATENT DOCUMENTS

| | | | |
|---|---|---|---|
| 2,869,383 | 1/1959 | Rapp | 180/79.1 |
| 4,580,648 | 4/1986 | Murakami | 180/79.1 |
| 4,650,019 | 3/1987 | Yanai | 180/79.1 |
| 4,687,976 | 8/1987 | Shimizu | 318/489 |
| 4,724,711 | 2/1988 | Sakakibara et al. | 180/79.1 X |
| 4,778,022 | 10/1988 | Kamiya | 180/79.1 |
| 4,798,253 | 1/1989 | Naito | 180/79.1 |

FOREIGN PATENT DOCUMENTS

| | | |
|---|---|---|
| 252071 | 12/1985 | Japan ................................. 180/79.1 |
| 24670 | 2/1986 | Japan ................................. 180/142 |

*Primary Examiner*—Mitchell J. Hill
*Attorney, Agent, or Firm*—Sughrue, Mion, Zinn, MacPeak & Seas

[57] ABSTRACT

An electrically driven power steering apparatus utilizes an electric motor as a drive source and produces an assisting torque which depends on the magnitude of a torque applied from steering mechanisms for assisting in the operation of a steering system. When an abnormality in the torque applied or a locking of the motor is detected, the energization of the motor is interrupted as is a system which transmits the assisting torque. In this manner, the application of a relative force to the steering system from the electric drive mechanism is blocked, thus positively preventing the vehicle from being steered against the intent of a driver as a result of influencs of any abnormal operation of the electric drive mechanism upon the steering system. Whenever the energization of the motor and the assisting torque transmission system are interrupted, the force required for the steering operation will be equivalent to a manual steering. During a normal operation, an assisting torque which is controlled in accordance with a torque detected by the torque detector mechanism is applied, enabling a facilitated steering operation.

8 Claims, 10 Drawing Sheets

Fig. 8c forward rotation when P = H
    X = L and Y = H, reverse rotation when P = L
    X = H and Y = L.

ELECTRICALLY DRIVEN POWER STEERING APPARATUS

This is a continuation of application Ser. No. 045,999, filed May 4, 1987, now abandoned.

BACKGROUND OF THE INVENTION

The invention relates to a power steering apparatus which may be utilized to reduce the magnitude of a force which must be applied to steering means such as a steering wheel in order to steer a vehicle, and in particular, to an electrically driven power steering apparatus including an electric drive mechanism having an electric motor and which detects the magnitude of a torque that is applied from steering means to a direction controlling mechanism which establishes a particular direction in which the vehicle is to run and which applies a driving force of a magnitude corresponding to the magnitude of the torque to the direction controlling mechanism from the electric drive mechanism.

When it is desired to redirect wheels, a force of an increased magnitude is required to turn a steering wheel when the vehicle is at rest or is running at a low speed. In particular, with FF cars which are increasing in number recently and which have their front wheels designed as driving wheels, a further increase in the steering force is required.

To accommodate for this, a power steering apparatus which assists a driver in a steering operation has been proposed. Such apparatus produces a drive force in accordance with a steering force of a driver, and transmits it to a direction controlling mechanism (hereafter referred to as a steering system) which establishes a particular direction in which the vehicle is to run. Almost all of power steering apparatus which is currently in practical use is of hydraulic type. Thus, such apparatus is provided with a control valve, hydraulic cylinder and the like, and operates to produce an assisting steering force through a movement of a pressure oil in accordance with the steering force. However, it will be noted that such control valve, hydraulic cylinder and the like are bulky in size, and must be connected together through pipings which can only be bent with radii of curvature greater than a given value in order to avoid pressure losses. A hydraulic power steering apparatus must be provided with a reliable oil seal against leakage, which requires a troublesome mounting operation. Thus, a mounting of the power steering apparatus presents a problem in a vehicle such as FF car where available remaining space is small.

To overcome the described problem, there has been proposed an electrically driven power steering apparatus which utilizes an electric motor as a drive source and which detects the magnitude of a torque applied to a steering system from steering means so that the motor applies an assisting steering force to the steering system in a manner corresponding to the magnitude of torque detected. With this arrangement, the space utility is improved, and in addition, a varying magnitude of assisting steering force which cannot be obtained with a conventional hydraulic power steering apparatus, for example, an assisting steering force which is dependent on a vehicle speed, may be developed when used in combination with an electronic controller.

It is to be noted that in an electrically driven power steering apparatus of the kind described, a reliability of a very high level is required in the accuracy with which detector means detects the magnitude of a torque applied to the steering system from the steering means. Thus, if the torque detector means delivers an abnormal signal, a corresponding assisting steering force, which is abnormal, will be applied to the steering system. Specifically, if the torque detector means malfunctions in developing a detection signal as a result of a temperature rise within a running vehicle even though a driver of the vehicle performs no steering operation, a corresponding assisting steering force will be applied to the steering system to cause the running direction of the vehicle to be changed independently from the intent of the driver (hereafter referred to as "auto-steer"). The possibility for the occurrence of such situation could be minimized by providing a plurality of torque detector means to improve the reliability of detection. However, this presents an increased cost as another aspect. In addition, any improved reliability in the detection cannot be perfectly free from the occurrence of an abnormality.

In the event the motor has locked for some reason, as by an overload on the motor which causes a burn-out thereof, it is possible that the driver cannot change the running direction of the vehicle even though he attempts to steer the vehicle. Such occurrence may be considered as equivalent to the application of a force from the electric drive mechanism which tends to block the steering by the driver. In either instance, there is a likelihood of a serious risk during the running of the vehicle, and the risk will be greater with a faster running speed.

SUMMARY OF THE INVENTION

It is an object of the invention to positively prevent the influence of any malfunctioning of an electric drive mechanism upon a steering system.

The above object is accomplished in accordance with the invention in an electrically driven power steering apparatus, by the provision of blocking means which is activated whenever the magnitude of a torque detected by torque detector means is outside a preset reference range for blocking the application of a force relative to the direction controlling mechanism from the electric drive mechanism. With this arrangement, whenever the occurrence of an abnormality is detected by the torque detector means or if the motor has locked, the blocking means is activated to block the application of a relative force to the direction controlling mechanism, thereby positively preventing any abnormal operation of the electric drive mechanism from influencing upon the steering system. Thus, the magnitude of a torque detected will be within a preset range during a normal operation, and if a relative steering force, inclusive of a force which tends to block the steering by the driver, is applied against the intent of the driver, the torque detected will go out of the preset range to cause the blocking means to be activated, whereupon the force required for the steering operation will be equivalent to a manual steering, thus effectively preventing the vehicle from being steered against the intent of the driver.

The blocking means may comprise relay means which makes or breaks a feed line associated with a motor or clutch means which actuates or deactuates a coupling between the motor and the direction controlling mechanism. The relay means will be effective to operate in response to the detection of an abnormality by the torque detector means, but the clutch means is effective for response to an abnormal locking of the motor. Accordingly, both the relay means and the clutch means are provided in a preferred embodiment of the invention.

Figure 6:
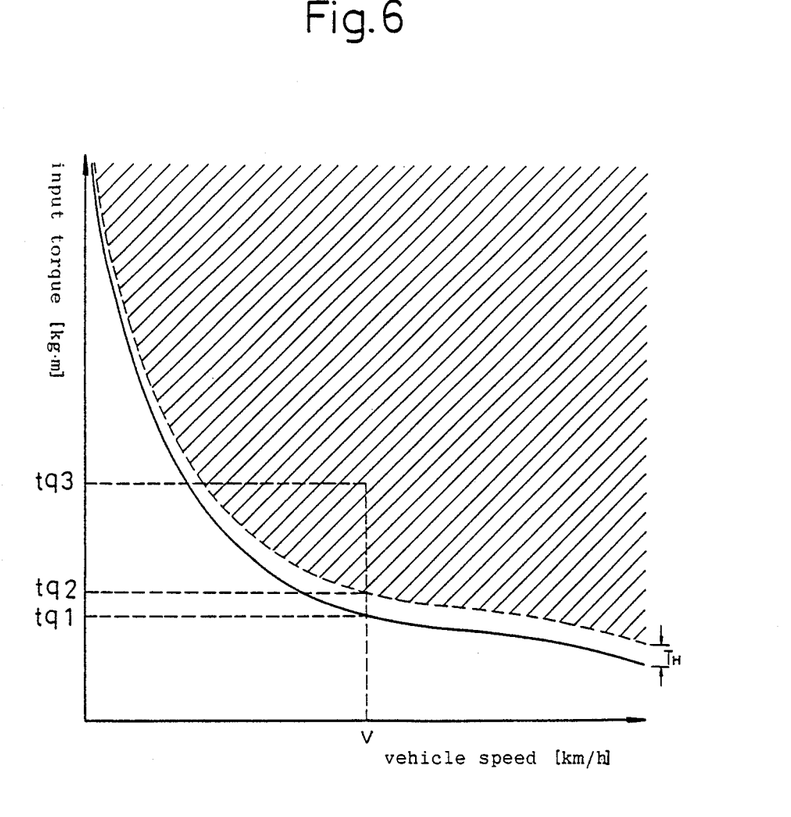
FIG. 6 graphically shows a relationship between an input torque and a vehicle speed.

It is found through the examination of the inventors that a steering force of a vehicle may be established in relation to a vehicle speed. FIG. 6 graphically shows an example of such relationship by a solid line. Referring to this Figure, the graphical representation indicates that when a vehicle speed is v km/h, for example, the application of a torque having an absolute magnitude of tql kg·m to the steering means allows the running direction of the vehicle to be changed. Accordingly, a detected torque in excess of tql kg·m for a vehicle speed v km/h may be considered as representing the occurrence of an abnormality.

Accordingly, in a preferred embodiment of the invention, a running of a vehicle is tried to define a graphical representation between the vehicle speed and the input torque as indicated by a solid line curve in FIG. 6. Such curve is then corrected by a given margin $T_H$ which takes the condition of the road surface into consideration, as indicated by broken line curve. If a detected torque is found in a hatched area which is defined by the broken line curve, for example, if an input torque tq3 kg·m is detected for a vehicle speed v km/h, this is determined as representing an abnormality of the electric drive mechanism, thus activating the blocking means. In the preferred embodiment, an erroneous detection which may be caused by noises is also taken into consideration, by determining the occurrence of an abnormality of the electric drive mechanism in the event the detected torque is found in the hatched area continuously over a preselected time interval.

Other objects and features of the invention will become apparent from the following description of an embodiment thereof with reference to the drawings.

DETAILED DESCRIPTION OF EMBODIMENT

Figure 1:
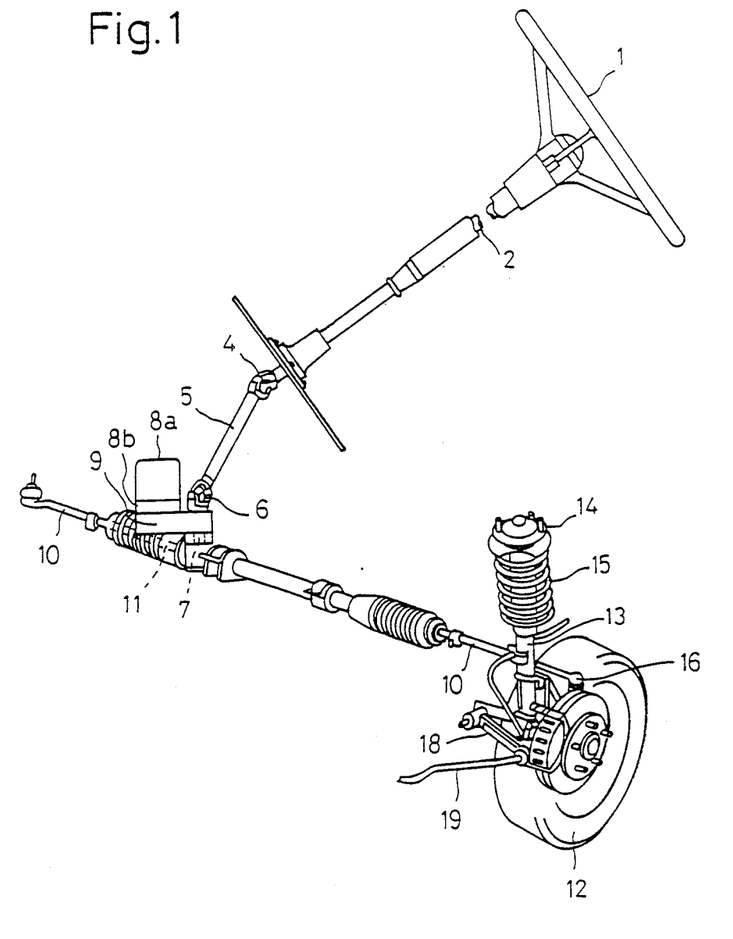
FIG. 1 is a perspective view, illustrating the general arrangement of a mechanical assembly according to one embodiment of the invention.

FIG. 1 shows a general arrangement of a mechanism used in one embodiment of the invention. A steering wheel 1 is fixedly connected with a first steering shaft 2, which is coupled to a second steering shaft 5 by means of a first universal joint 4. A second universal joint 6 couples the second steering shaft 5 to a rod 7, which is in turn coupled to an output shaft (21, to be described later) of a reduction gearing 9 on which a pinion gear (22, to be described later) is formed. Steering wheel 1, steering shafts 2 and 5, and universal joints 4 and 6 will hereinafter be called the steering means. The pinion gear (22) meshes with a rack 11 which is fixedly mounted on a tie rod 10. The tie rod 10 is coupled to a steering knuckle arm 16 of a wheel 12. The wheel 12 has an axle which is fastened to a shock absorber 13 having a suspension upper support 14 which is coupled to a car body, not shown. A coiled spring 15 is connected between the upper support 14 and the axle to serve as a vibration buffer. A lower suspension arm is shown at 18 and a stabilizer bar is shown at 19.

Figure 2:
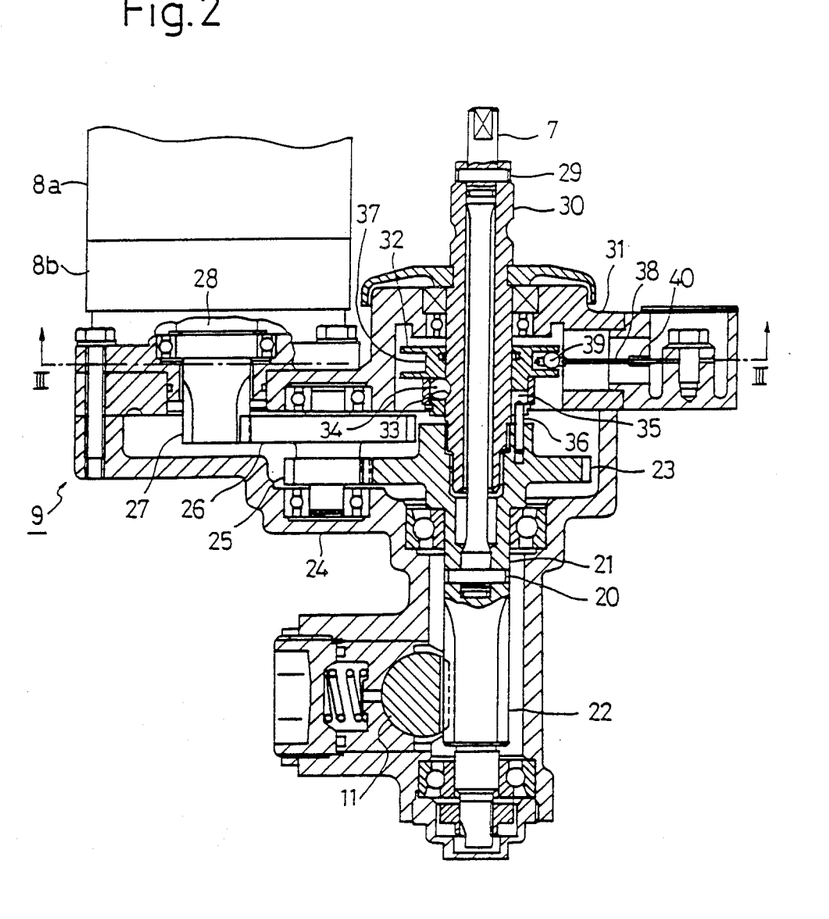
FIG. 2 is a cross section, to an enlarged scale, of a reduction gearing shown in FIG. 1, as taken along the line II—II shown in FIG. 3.
Figure 3:
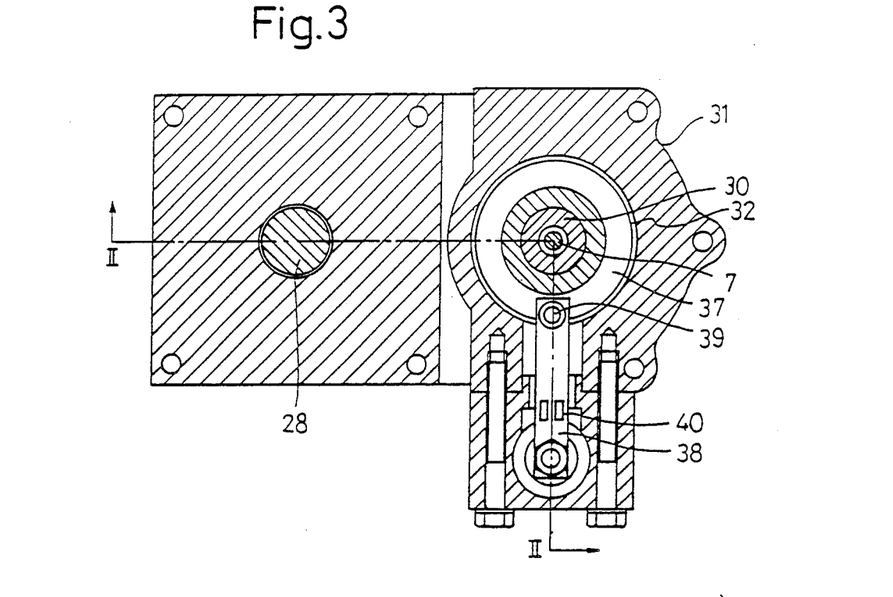
FIG. 3 is a cross section taken along the line III—III shown in FIG. 2.

The internal construction of the reduction gearing 9 is shown in FIGS. 2 and 3. The upper end of the rod 7 is coupled to the second steering shaft 5 through the second universal joint 6 (see FIG. 1). A sleeve 30 is secured to the rod 7, slightly below the upper end thereof, by means of a pin 29. The sleeve 30 is rotatably mounted in an upper reduction gearing case 31 (see FIG. 2). The rod 7 extends through the sleeve 30 and into an output shaft 21, with its bottom end being secured to the output shaft 21 by means of a pin 20. The output shaft 21 is rotatably mounted in a lower reduction gearing case 24, and is formed with a pinion gear 22 on its lower end, which meshes with the rack 11. Rod 7, tie rod 10, rack 11, steering knuckle arm 16, and pinion gear 22 will hereinafter be called the direction controlling means. Accordingly, as the steering wheel 1 (see FIG. 1) rotates, the output shaft 21 is driven for rotation through a path including the first steering shaft 2, the first universal joint 4, the second steering shaft 5, the second universal joint 6 and the rod 7, whereby the rack 11 meshing with the pinion gear 22 on the output shaft 21 is driven in a direction perpendicular to the plane of the drawing of FIG. 2 or in a direction in which the tie rod 10 extends, as viewed in FIG. 1, thus changing the direction of the wheel 12 (see FIG. 1).

The output shaft 21 includes a hollow upper end around which a ring gear 23 is formed for meshing engagement with an intermediate gear 25 which is rotatably mounted within the case 24. Another intermediate gear 26 is coaxial and integral with the intermediate gear 25 and meshes with an input gear 27. The input gear 27 is fixedly mounted on an output rotating shaft 28 of a clutch 8b which is coupled to the output from an electric motor 8a. Motor 8a, clutch 8b, and reduction gear 9 will hereinafter be called the electric drive mechanism. When the motor 8a is energized, a transmission path including the clutch 8b which is activated, and the gear train 27 - 26 and 25 - 23 is effective to cause the output shaft 21 to rotate, whereupon the rack 11 meshing with the pinion gear 22 on the output shaft 21 is driven in a direction perpendicular to the drawing of FIG. 2 or in a direction in which the tie rod 10 extends, as viewed in FIG. 1, thus changing the direction of the wheel 12 (see FIG. 1).

In this manner, the direction of the wheel 12 can be changed in response to either the rotation of the steering wheel 1 or the energization of the motor 8a for rotation in either forward or reverse direction.

Figure 4:
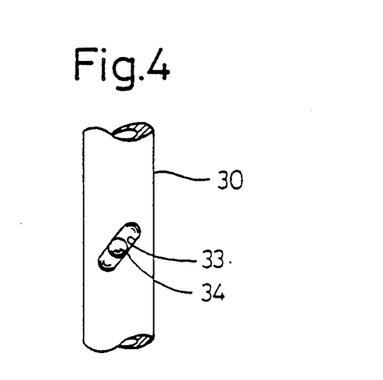
FIG. 4 is a plan view of a sleeve shown in FIGS. 2 and 3, illustrating the external surface thereof.

A wheel 32 is rotatably mounted on the sleeve 30 or the sleeve 30 extends through the wheel 32. As shown in FIG. 4, the external surface of the sleeve 30 is formed with a groove 33 having a rounded bottom and which extends at an angle with respect to the center axis of the sleeve 30, with a ball 34 being received in the groove 33 and held in place by the wheel 32. The wheel 32 is formed with a groove 35 of a reduced width, into which the upper end of a pin 36 which is fixedly mounted on the top end of the output shaft 21 extends. The pin 36 thus constrains the wheel 32 from rotating.

As the rod 7 rotates, the sleeve 30 and the output shaft 21 also rotate, but since the sleeve 30 is fixedly mounted on the upper end of the rod 7 and the output shaft 21 is fixedly mounted on the lower end of the rod 7, the rod 7 will be twisted if a load upon the output shaft 21 is high. The angle of rotation of the sleeve 30 will be offset from the angle of rotation of the output shaft 21 by an amount corresponding to the magnitude of such twist, and since the wheel 32 is coupled through the pin 36 to rotate with the output shaft 21, such offset in the angle of rotation will be reflected in an offset in the angle of rotation between the sleeve 30 and the wheel 32. In other words, the sleeve 30 will rotate relative to the wheel 32 by an additional amount which corresponds to the offset, and since the groove 33 formed in the sleeve 30 extends at an angle with respect to the center axis of the sleeve 30, the groove 33 is effective to urge the ball 34 either upward or downward, whereby the wheel 32 which supports the ball 34 will shift upward or downward. The twist of the rod 7 corresponds to a steering torque applied to the steering wheel 1, and the wheel 32 shifts to an upper or lower position which corresponds to such twist. In this manner, a vertical displacement of the wheel 32, or more exactly, the shift thereof vertically upward or downward from the position corresponding to zero steering torque, corresponds to the steering torque.

The wheel 32 is also formed with an annular groove 37 in which a ball 39 is engaged, as shown in FIG. 3. The ball 39 is rotatably carried by one end of a resilient blade 38, the other end of which is fixedly anchored. The resilient blade 38 has a total of four strain detecting elements or strain gages 40 cemented thereto, i.e., thus two elements on the front surface and two on the back surface. It will be noted that a strain gage represents an electrical element having a resistance which changes with the magnitude of a strain. These four strain gages are connected in a bridge configuration (see FIG. 5) whereby an output voltage corresponding to a difference in the resistance between the front and the back surface can be obtained as a torque detection signal. Since the strain gages on one surface is subject to a compressive stress while the strain gages on the other surface is subject to a tensile stress, signals of opposite polarities are obtained, resulting in a difference which is twice the signal level obtained from only one surface. When the rod 7 is twisted in response to a steering torque applied to the steering wheel 1 to cause the wheel 32 to be displaced either upward or downward from zero position as mentioned previously, the engagement between the groove 37 and the ball 39 causes the resilient blade 38 to be warped or flexed either upward or downward, whereby the strain gage assembly 40 provides an electrical signal indicative of a displacement of the wheel 32 from zero torque position or the twist of the rod 7 which is in turn equivalent to the steering torque applied.

Figure 5:
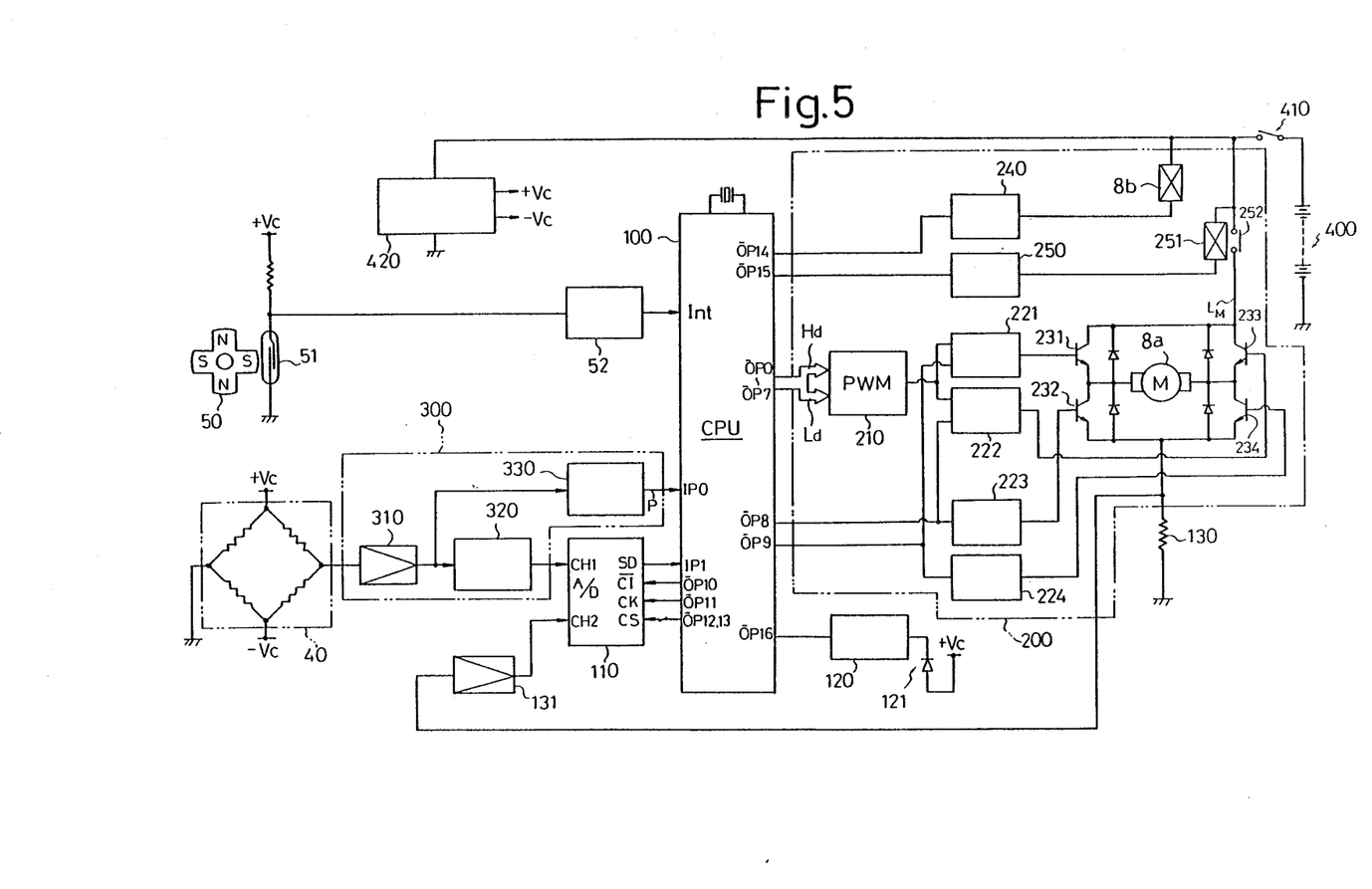
FIG. 5 is a block diagram of an electrical control system of the embodiment.

FIG. 5 shows an electrical control system which energizes the motor 8a for rotation in accordance with an output signal from the strain gage assembly 40. The electrical control system essentially comprises a microprocessor (CPU) 100, a motor energization circuit 200, the strain gage assembly 40 and a torque detector circuit 300. The motor 8a is connected to a bridge of the energization circuit 200 comprising switching transistors 231, 232, 233 and 234. Specifically, when the transistors 231 and 234 are both on, the motor 8a rotates in a forward direction to drive the output shaft 21 for clockwise rotation, which corresponds to a turning of the steering wheel 1 in a clockwise direction or a right turn of the vehicle. Conversely, when the transistors 233 and 232 are both on, the motor 8a rotates in the reverse direction, driving the output shaft 21 for counter-clockwise rotation, which corresponds to a turning of the steering wheel 1 in the counter-clockwise direction or a left turn of the vehicle. Thus, the transistors 232 and 234 determine the direction in which the motor 8a rotates while the transistors 231 and 233 are effective to control an effective current flow through the motor 8a by a duty cycle control, thus controlling a mean value of the energizing current or an output torque from the motor.

The transistors 231 and 233 have their collectors connected to a feed line $L_M$, which is in turn connected through relay contacts 252 and an ignition switch 410 to the positive terminal of an onboard battery 400. The transistors 232 and 234 have their emitters connected through a common resistor 130 to the negative terminal of the battery 100, which represents the electrical ground of the apparatus. The resistor 130 serves detecting an energizing current through the motor 8a.

A switching driver 224 is connected to an output port OP9 of CPU 100, and operates to turn the transistor 234 on whenever an input from this output port is at its high level H. If the input from the port is at its low level L, the driver maintains the transistor 234 off. A switching transistor 223 is connected to receive an input from an output port OP8 of CPU 100, and operates to turn the transistor 232 on if the output from the port is at its high level H. If the input from the port is at its lower level L, the driver 223 maintains the transistor 232 off. A switching driver 221 is connected to the output of a pulse width modulator (hereafter abbreviated as PWM) 210. When the output from the modulator is at its H level and the input to the driver 224 is at its H level, the driver 221 turns the transistor 231 on, while it maintains the transistor 231 off whenever either input is at its L level. Similarly, a switching driver 222 is connected to the output of the modulator 210, and operates to turn the transistor 233 on when the output from PWM 210 is at its H level and the input to the driver 223 is at its H level, and maintains the transistor 233 off whenever either input is at its L level. Pulse width modulator 210, switching drivers 221-223, PWM switching transistors 231 and 233, and CW switching transistors 232 and 234 will hereinafter be called first energization means.

In the present embodiment, PWM 210 comprises a digital timer including a preset counter, a clock pulse oscillator and a controller. Specifically, data Hd is loaded into the counter, which then initiates a count down operation. It delivers a high level H, commanding a transistor on condition, until the counter produces a carry (or underflow), whereupon it delivers a low level L, commanding a transistor off condition. Data Ld is then loaded into the counter, which then initiates a count down operation. When the counter produces a carry for the second time, data Hd is again loaded into the counter to initiate a count down operation. Such operation is subsequently repeated. In this manner, PWM 210 repeatedly delivers a high level H during a time duration which corresponds to data Hd and delivers a low level L during a time duration corresponding to data Ld. Accordingly, the resulting duty cycle is given by Hd/(Hd+Ld). Obviously, when Hd is equal to zero, the L output is continued. Data Hd and Ld which specify the duty cycle are delivered from output ports OP0 to OP7 of CPU 100. Output ports OP0-OP9 of CPU 100 will hereinafter be called first energization command means.

A relay driver 250 has a control terminal which is connected to an output port OP15 of CPU 100, and energizes a relay 251 to make its relay contacts 252, which are normally open, when an H level is applied from this port. A clutch driver 240 has a control terminal connected to an output port OP14 of CPU 100, and energizes the clutch 8b to allow the output from the motor 8a to be transmitted to the input gear 27 when an H level is applied from the port. Clutch driver 240 and relay driver 250 will hereinafter be called second energization means. Output ports OP14 and OP15 of CPU 100 will hereinafter be called second energization command means.

The strain gage assembly 40 is connected to the torque detector circuit 300. A detection voltage from the assembly 40 is filtered and linearly amplified for level calibration in an amplifier 310 before it is applied to an absolute magnitude circuit 320 and a polarity decision circuit 330. The circuit 330 determines the polarity of an output voltage from the amplifier 310. The polarity corresponds to the direction of rotation of the steering wheel 1, assuming a positive polarity when a wheel is turned clockwise and a negative polarity when the wheel is turned counter-clockwise. In this manner, a direction signal P having an H level for a positive polarity and an L level for a negative polarity is fed to an input port IP0 of CPU 100. The absolute magnitude circuit 320 develops a signal (of positive polarity) representing the absolute magnitude of an output from the amplifier 310 or the absolute magnitude of the torque detected, which is applied to an input CH1 of an A/D converter 110.

The voltage developed across the resistor 130 is smoothed and amplified for level calibration in an amplifier 131 before it is applied to an input CH2 of the converter 110. The converter 110 has a clock inhibit input terminal CI (L level active) which receives a clock inhibit signal from an output port OP10 of CPU 100. The converter has a clock input terminal CK which is supplied with a clock signal from an output port OP11. The converter 110 also includes a channel select terminal CS which is supplied with a channel select signal from output ports OP12 and OP13. When the clock inhibit signal assumes its H level or when the inhibition is removed, the converter 110 performs a digital conversion of selected one of CH1 and CH2 inputs to deliver its output to an input port IP1 of CPU 100 from its output terminal SD.

A four pole permanent magnet 50 is fixedly connected to a speedometer cable, not shown, namely a wire which rotates in interlocked relationship with the output shaft of the change gearing, for turning a reed switch 51 on and off. The switch 51 is connected to an input terminal of an amplifier and waveform shaper 52, which then feeds a pulse of an L level when the switch 51 is on or a pulse of an H level when the switch 51 is off to an interrupt input port Int of CPU 100. Such pulse represents a vehicle speed detecting pulse.

A constant voltage power supply circuit 420 is fed from the battery 100 through the ignition switch 410 and supplies required constant voltages (+Vc, −Vc) to various circuit portions.

Figure 7:
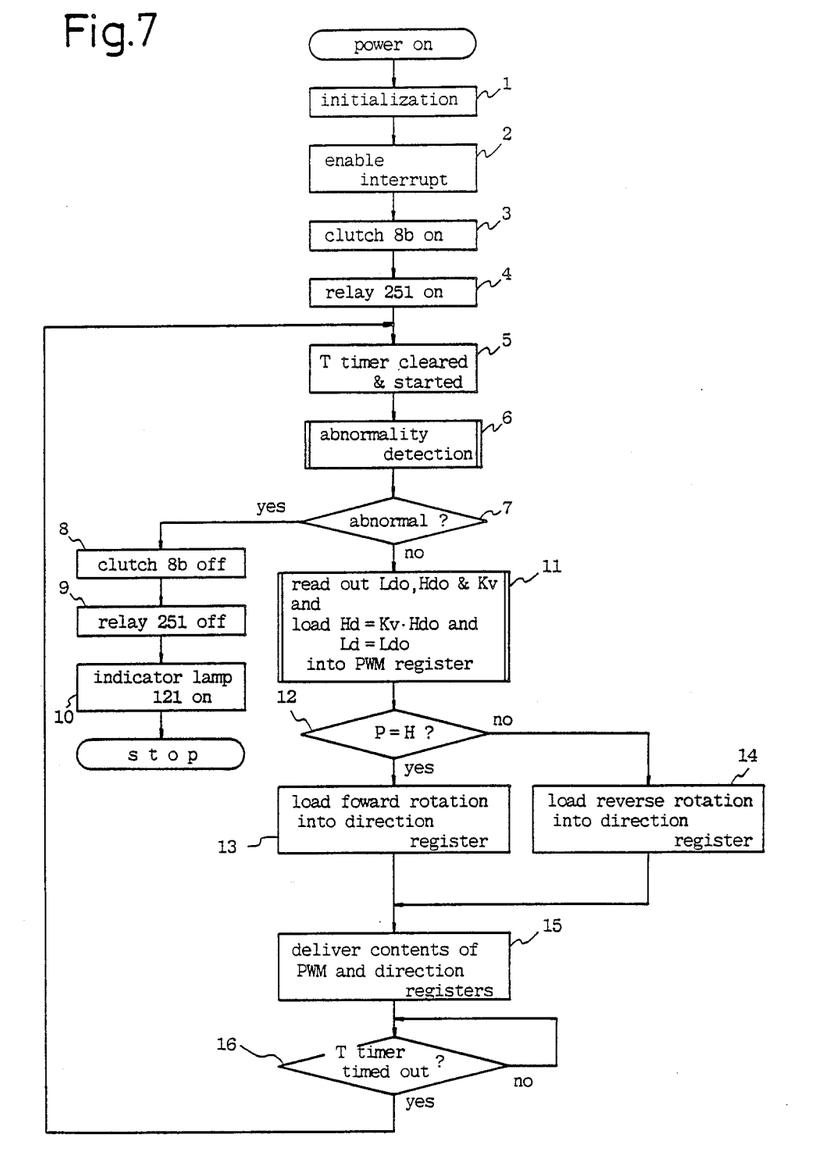
FIG. 7 is a flowchart of a general control operation by a microprocessor shown in FIG. 5.

FIG. 7 is a flowchart which shows a principal control operation by CPU 200 in controlling the electrically driven power steering apparatus. In the description to follow, a numeral indicated in parentheses represents a step number in the flowchart. When the power is turned on or the ignition switch 410 is closed to allow the circuit 420 to deliver required constant voltages, CPU 100 initializes input/output ports, registers, timers and flags (1). In other words, it establishes a condition which is required for a standby condition. An interrupt operation is then enabled (2), and an interrupt processing operation is executed each time an input to the interrupt port changes from H to L level. The interrupt processing operation which is executed when the input from the port changes from its H to L level is shown in FIG. 9.

Figure 9:
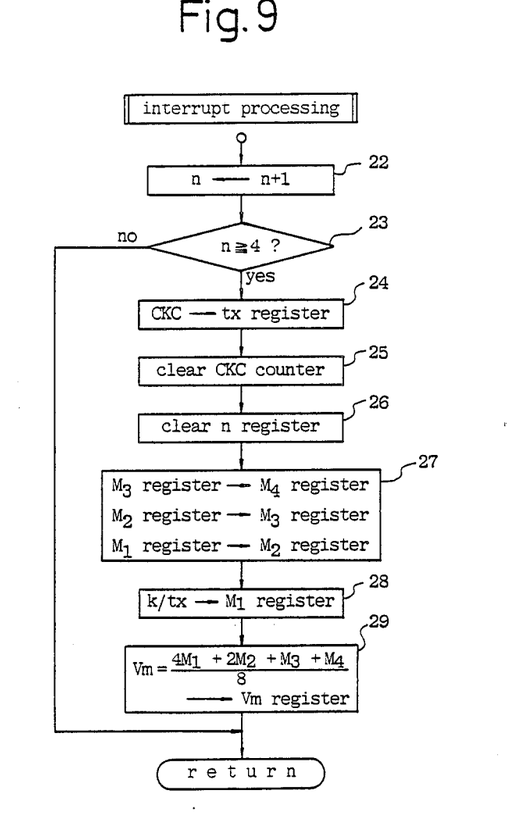
FIG. 9 is a flowchart of an interrupt processing operation by the microprocessor.

FIG. 9 describes the interrupt processing operation, which includes a reference presetting means that presets a reference range in accordance with a vehicle speed detected by the vehicle speed detector means. In the interrupt processing operation, an n register which counts the number of interrupt requests is incremented by one (22), and its content is examined to see if it is equal to 4 (23). Unless the count is equal to 4, the program returns to a main routine. If the count is equal to 4, a count in a clock pulse counter (program counter) CKC is stored in tx register (24), the counter CKC is cleared (25) and the n register is also cleared (26). The counter CKC counts up from 0 again when it is cleared. The content tx of the tx register corresponds to a time interval during which 4 vehicle speed detecting pulses appear (one revolution of speedometer cable). To enable a calculation of a mean value of vehicle speed, the content of $M_3$ register is transferred to $M_4$ register, the content of $M_2$ register is transferred to $M_3$ register, and the content of $M_1$ register is transferred to $M_2$ register (27), and K/tx is stored in $M_1$ register (28). It should be noted that "tx" represents the content of tx register and K represents a constant. This constant is used to derive the frequency of vehicle speed detecting pulses or vehicle speed on the basis of four periods (tx) of output pulses from the waveform shaper 52, and thus K/tx represents vehicle speed data.

Next, a mean vehicle speed is calculated according to the following formula:
$$Vm = (4M_1 + 2M_2 + M_3 + M_4)/8$$

and is stored in Vm register (29), whereupon the program returns to the main routine. It will be understood that $M_1$, $M_2$, $M_3$ and $M_4$ refer to the content of $M_1$, $M_2$, $M_3$ and $M_4$ registers, respectively. A weighted mean is derived in this manner in order to minimize the probability of an erroneous detection of the vehicle speed which may be caused by noises. As a result of described interrupt processing operation, vehicle speed data is maintained in Vm register, and is updated to a latest one every time four consecutive vehicle speed detecting pulses are developed.

Returning to FIG. 7, after the interrupt operation is enabled (2), the clutch 8b is energized (3) and the relay 251 is energized (4). T timer which determines a period with which the torque detected is read is started (5), and an abnormality detecting subroutine is executed (6). The abnormality detecting subroutine is illustrated in FIG. 10.

Figure 10:
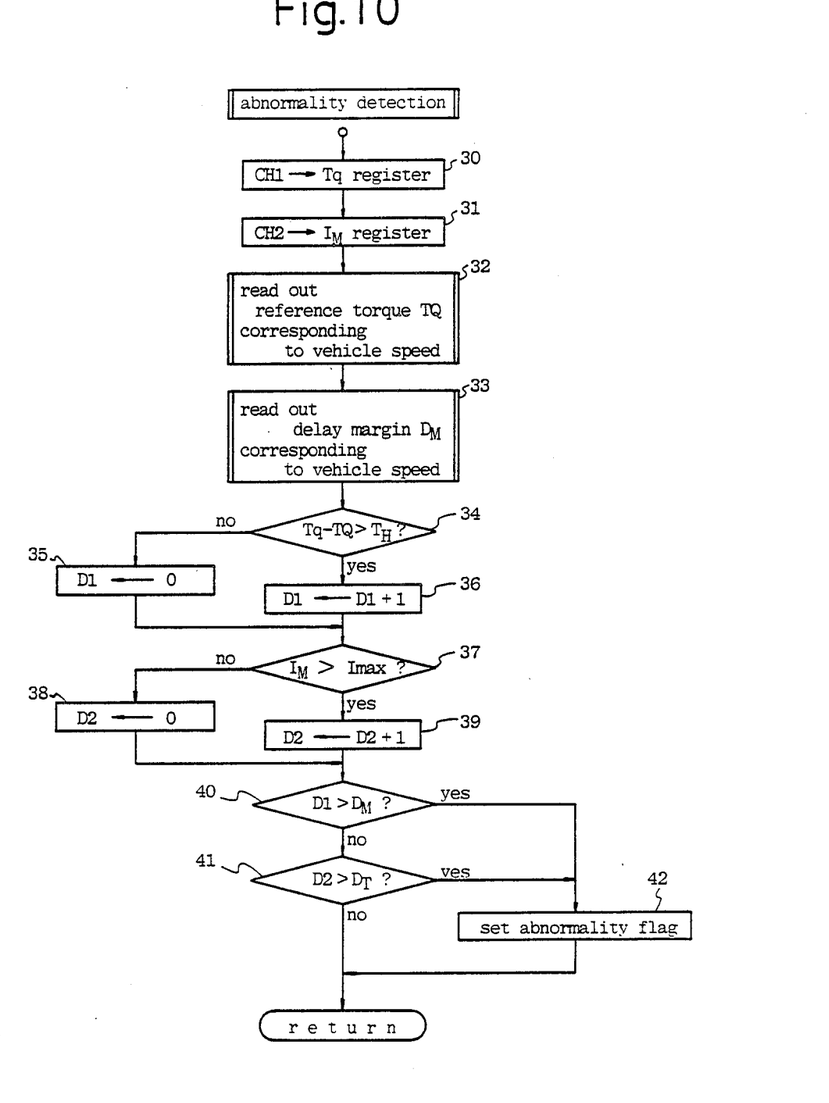
FIG. 10 is a flowchart of an abnormality processing operation by the microprocessor.
Figure 11:
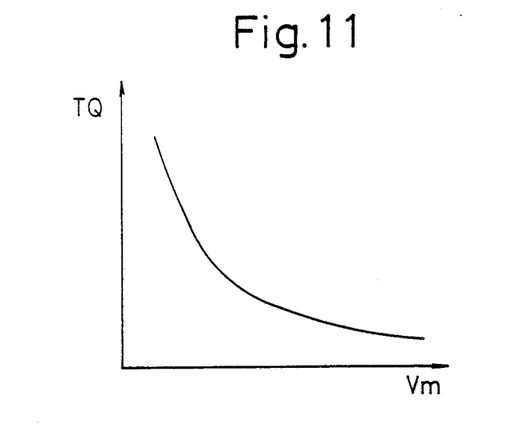
Figure 12:
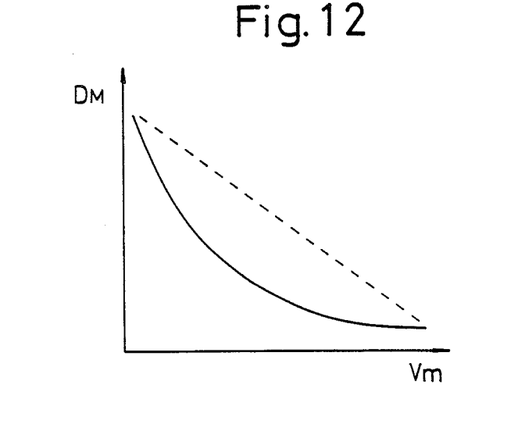

Referring to FIG. 10, A/D converter 110 is commanded to effect an A/D conversion of CH1 input and converted data representing the absolute magnitude of the torque detected by the strain gage assembly 40 is read and stored in Tq register (30). Similarly, an A/D conversion of CH2 input is commanded, and converted data representing the smoothed current value through the motor 8a is read and stored in $I_M$ register (31). As mentioned previously, the internal ROM of CPU 100 stores a relationship between reference torque TQ and vehicle speed Vm as shown in FIG. 11, which corresponds to the solid line curve shown in FIG. 6, and reference torque TQ which corresponds to the value in Vm register or the prevailing vehicle speed is read out (32). It is to be understood that to save the memory capacity, ROM stores discrete, digital data, and if reference torque TQ which exactly corresponds to the prevailing vehicle speed Vm is not found, the reference torque TQ is determined by interpolation. The internal margin $D_M$ and the vehicle speed Vm as indicated by a solid curve in FIG. 12, and a delay margin $D_M$ which corresponds to the value in Vm register or the prevailing vehicle speed is read out (33). Again, ROM stores discrete, digital data for purpose of saving the memory capacity, and hence the solid line curve shown in FIG. 12 is actually stepped. (No interpolation is made.)

A value in Tq register or the prevailing torque Tq detected from which the magnitude of reference torque TQ is subtracted is compared against the torque margin $T_H$ (34). If the difference is equal to or less than the margin $T_H$, D1 register is cleared (35). However, if the difference exceeds the margin $T_H$, meaning that the input torque resides in the hatched area shown in FIG. 6, D1 register is incremented by one (36). The value in $I_M$ register or the prevailing current value $I_M$ is compared against a maximum current value Imax (37) and if the current value $I_M$ is equal to or less than Imax, D2 register is cleared (39) while if the current value exceeds Imax, D2 register is incremented by one (38).

As will be described later, the abnormality detecting subroutine is repeatedly executed in a loop fashion, and hence if a condition in which Tq - TQ>$T_H$ continues, the value in D1 register will exceed the value of the delay margin $D_M$. When this fact is detected (40), an abnormality flag is set (42). In other words, the delay margin $D_M$ represents a margin which is utilized for preventing an erroneous detection caused by noises. It is necessary that the response be more rapid as the vehicle speed increases, and accordingly it is established in accordance with a solid line curve shown in FIG. 12. (In this instance, a linear curve as indicated by broken lines in FIG. 12 may be alternatively used.) Similarly, when a condition in which $I_M$> Imax continues, the value in D2 register exceeds a given threshold $D_T$. When this fact is detected (41), an abnormality flag is set (42). The threshold $D_T$ represents a margin which is used to remove the influences of noises, but in the present instance, it also serves the protection of the motor 8a, and hence assumes a fixed value.

Returning to the main routine shown in FIG. 7, a decision against abnormality is made (7). When the abnormality flag is set during the abnormality detecting subroutine, the deenergization of the clutch 8b is commanded (8), the deenergization of the relay 251 is commanded (9), and the energization of the abnormality indicator lamp 121 is commanded (10), thus ceasing the operation. When the operation ceases in this manner, the electrically driven power steering apparatus does not operate unless the power is again turned on or the ignition switch 410 is turned on again after it has once been turned off to stop the engine. In this instance, the apparatus operates as a manual steering apparatus. If the abnormality flag is not set, the program proceeds to step 11 and subsequent steps.

Figure 8A:
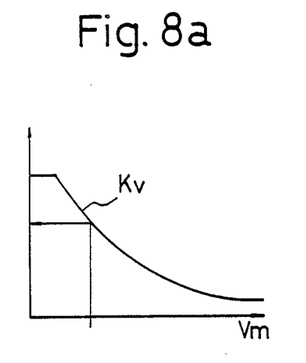
FIGS. 8a, 8b, 11 and 12 are schematic illustrations of data which are stored in an internal ROM of the microprocessor.
Figure 8B:
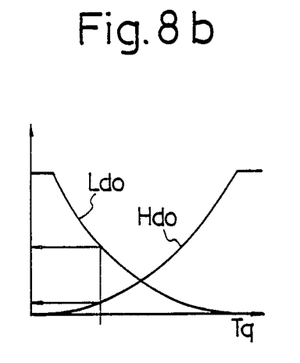

The internal ROM of CPU 100 stores duty cycle data Hdo, Ldo assigned to the respective values of the absolute magnitude of the torque detected Tq, an assisting torque rate Kv assigned to the respective values of the vehicle speed. These values are qualitatively and graphically shown in FIGS. 8a and 8b. Since ROM stores digital data, the curves shown in FIGS. 8a and 8b are actually stepped.

Figure 8C:
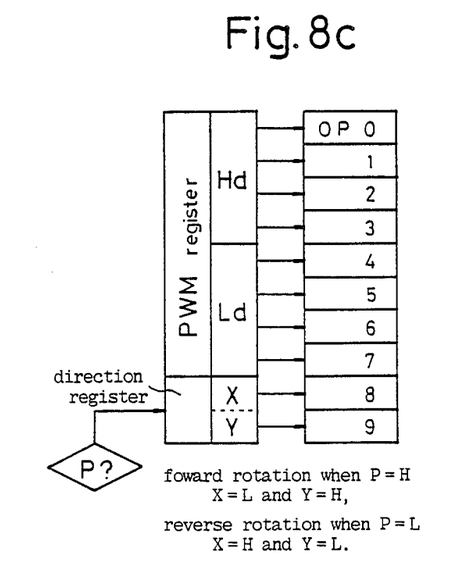
FIG. 8c is a view showing the correlation between data in the internal register of the microprocessor and output ports.

CPU 100 reads data Hdo, Ldo which correspond to the value in tq register (the torque detected) from its internal ROM, and also reads data Kv which corresponds to the content of Vm register (vehicle speed) from its internal ROM, and calculates Hd=Kv·Hdo. Hd calculated in this manner is stored in the four least significant bits of PWM register while Ldo which is read out is stored in the four most significant bits of PWM register (11). The direction signal P which is applied to the input port IP0 is then examined (12), and if the signal assumes an H level, indicating that the torque detected is of positive polarity, which means that the steering wheel 1 is turned clockwise, data commanding a forward rotation (that is, the direction in which the motor 8a rotates in order to drive the output shaft 21 clockwise) is loaded into a direction register (13). If the direction signal P assumes an L level, or when the torque detected is of negative polarity, meaning that the steering wheel is turned counter-clockwise, data commanding a reverse rotation (the direction in which the motor 8a rotates in order to drive the output shaft 21 counter-clockwise) is loaded into the direction register (14). Subsequently, the content of PWM register is delivered to output ports OP0 to OP7, and the content of the direction register is delivered to output ports OP8 and OP9 (15). The assignment of the content of the PWM register and the content of the direction register to output ports is illustrated in FIG. 8c. As a result of the output delivery (15), when the torque detected Tq (value in Tq register) assumes a value adjacent to zero but greater than a given value (Hd>0), a current passes through the motor 8a with the duty cycle of Hd/(Hd+Ld), allowing the motor 8a to drive the output shaft 21 for rotation in the direction which is indicated by the turning direction of the steering wheel 1. The output torque from the motor 8a corresponds to the duty cycle, or corresponds to the torque detected Tq and the vehicle speed Vm. The greater the torque detected Tq and the lower the vehicle speed Vm, the greater the torque which is applied from the motor 8a to the output shaft 21.

Subsequently, CPU 100 examines T timer (16) to see if the time passed since the step 5 has become equal to or exceeded T. If the time interval has exceeded T, the program returns to step 5. If the interval has not exceeded T, the program waits for the time interval to exceed this value, whereupon it returns to step 5.

In this manner, the abnormality detecting subroutine (6), the decision against the abnormality (7), the calculation of the duty cycle of the current which energizes the motor 8a (11) and the command to energize the motor (12 to 15) are executed repeatedly with a period T. In the event of occurrence of an abnormality, the abnormality processing operation (8 to 10) is executed. The operation and advantages of the described embodiment will be summarized below.

(1) The absolute magnitude Tq of the torque detection signal from the strain gage assembly 40 and the energizing current $I_M$ of the motor 8a are read with the period T.

(2) The torque detected Tq is compared against reference torque TQ which depends on the vehicle speed. If the torque detected Tq is equal to or less than the sum of the reference torque TQ and the margin $T_H$ which is used to take the condition of the road surface into consideration, the operation is determined to be normal, and the motor 8a is energized with a duty cycle Hd/(Hd+Ld) which is determined by the Tq value and the vehicle speed Vm. The direction in which the motor 8a rotates is determined by the direction signal P which is output from the polarity decision circuit 330. The rotation will be clockwise if the signal P is positive, and will be counter-clockwise if the signal is negative.

(3) When the torque detected Tq exceeds a sum of the reference torque TQ and the margin $T_H$, the time duration during which such condition prevails is determined. If the time duration exceeds the delay margin $D_M$ which depends on the vehicle speed, the occurrence of an abnormality is determined, deenergizing the cluth 8b and the relay 251 and illuminating the light emitting diode 121. Since the delay margin $D_M$ is designed so as to be dependent on the vehicle speed, the abnormality processing operation takes place rapidly when the vehicle speed is high and slowly when the vehicle speed is low so as to be substantially free from influences of noises.

(4) When the energizing current $I_M$ exceeds the maximum value Imax, a time duration during which such condition prevails is determined. If such time duration exceeds the given threshold $D_T$, the occurrence of an abnormality is determined, deenergizing the clutch 8b and the relay 251 and illuminating the light emitting diode 121. Since the protection of the motor 8a is independent from the speed, $D_T$ has a fixed value.

In response to the abnormality processing operation, the clutch 8b functions to uncouple the reduction gearing 9 from the motor 8a, whereby the output shaft 21 is driven for rotation only by the force which is applied to the steering wheel 1, thus without assistance from the apparatus of the invention. Accordingly, there is no difficulty in performing the steering operation if the motor 8a has locked for some reason.

As described, in accordance with the invention, if the torque detector means detects an abnormality or if the motor has locked, blocking means is energized to block the application of a relative force to the direction controlling mechanism, thus positively preventing any abnormal operation of the electric drive mechanism from influencing upon the steering system. The blocking means is comprised of relay and clutch circuits, and is located in the motor energization circuit 200 (see FIG. 5). Thus, the torque detected will be within a preset range during a normal operation, but if a relative steering force is applied against the intent of a driver (including a force to block the steering by the driver which may be caused by a locking of the motor), the torque detected will go out of the preset range, whereupon the blocking means is energized. The force required for the steering operation will then be equal to a manual steering, thus preventing the vehicle from being steered against the intent of the driver. During a normal operation, an assisting torque which is controlled in accordance with the torque detected by the torque detector means is applied, enabling a facilitated steering.

What is claimed is:

1. An electrically driven power steering apparatus comprising:
   a direction controlling mechanism for turning the wheels relative to a car body;
   steering means coupled to the direction controlling means for driving a car;
   torque detector means for detecting the magnitude of a torque which is applied to the direction controlling means from the steering means;
   an electric drive mechanism including an electric motor coupled to the direction controlling means;
   first energizing means for energizing the motor in the electric drive mechanism;
   blocking means for cutting off and preventing the application of a driving force to the direction controlling means from the electric drive mechanism;
   second energizing means for energizing the blocking means; and
   an electrical control system:
   first energization command means for commanding the first energizing means in order to generate an assisting torque corresponding to the torque detected by the torque detector means;
   and second energization command means for causing the second energizing means to energize the blocking means whenever the torque detected by the torque detector means goes out of a preset reference range whereby abnormality of the torque detector means is detected.

2. An electrically driven power steering apparatus according to claim 1 in which the blocking means comprises relay means connected in a feed line extending to the motor.

3. An electrically driven power steering apparatus according to claim 1 in which the blocking means comprises clutch means interposed between the motor and a gear reduction means between the electric drive mechanism and the direction controlling means.

4. An electrically driven power steering apparatus according to claim 1 in which the blocking means comprises relay means connected in a feed line to the motor, and clutch means interposed between the motor and a gear reduction means between the electric drive mechanism and the direction controlling mechanism.

5. An electrically driven power steering apparatus according to claim 1 in which the second energization command means comprises vehicle speed detector means which detects a vehicle speed, and reference range presetting means, the reference range presetting means presetting a reference range in accordance with a vehicle speed detected by the vehicle speed detector means.

6. An electrically driven power steering apparatus according to claim 1 in which the second energization command means comprises time limit means and means for presetting a time interval for said time limit means, the time limit means beginning to count a time interval as soon as the torque detected by the torque detector means goes out of the preset reference range and causing the second energizing means to energize the blocking means when the time limit means reaches the end of the time interval before the torque detected by the torque detector means comes back into the preset reference range.

7. An electrically driven power steering apparatus according to claim 6 in which the time limit presetting means comprises vehicle speed detector means which presets a time interval in accordance with a vehicle speed detected by the vehicle speed detector means.

8. An electrically driven power steering apparatus according to claim 5 in which the reference range presetting means establishes a predetermined range of allowable torque values, compares the present vehicle velocity dependent torque values with the reference torque values, and updates the preset reference range corresponding to the vehicle velocity.

* * * * *